United States Patent Office 3,122,543
Patented Feb. 25, 1964

3,122,543
N-(ALKOXYALKYL)-4,7-DIAMINO-2-ARYL-6-PTERIDINECARBOXAMIDES
Thomas S. Osdene, West Chester, Pa., assignor to American Home Products Corporation, New York, N.Y., a corporation of Delaware
No Drawing. Filed July 2, 1962, Ser. No. 207,098
5 Claims. (Cl. 260—251.5)

This invention relates to novel pteridine compounds possessing useful pharmacological properties. More particularly, it relates to alkoxyalkylamides of 4,7-diamino-2-aryl-6-pteridinecarboxylic acids. The compounds of this invention have the formula

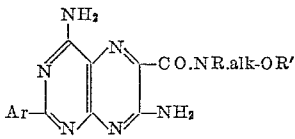

where Ar represents an aryl group which may be phenyl or phenyl substituted once or twice by lower alkyl, lower alkoxy, fluorine, chlorine, bromine, or trifluoromethyl substituents, R represents hydrogen or lower alkyl, alk represents an alkylene radical containing from one to four carbon atoms (e.g., methylene, ethylene, trimethylene, or tetramethylene), and R' represents a lower alkyl group.

As used herein, the terms lower alkyl and lower alkoxy signify alkyl and alkoxy groups containing from one to four carbon atoms.

These novel pteridine derivatives exhibit diuretic activity, especially in a triuretic activity, and are also anti-viral and anti-bacterial agents. By reason of these useful properties, coupled with their very low toxicities, the compounds of this invention are of value in both human and veterinary medicine.

Several processes are suitable for preparing the compounds of this invention. A particularly preferred process comprises heating together in an anhydrous neutral polar solvent a 4,6-diamino-2-aryl-5-nitrosopyrimidine and an N-alkoxyalkyl cyanoacetamide in the presence of a basic catalyst, whereby a condensation reaction is effected according to the following equation.

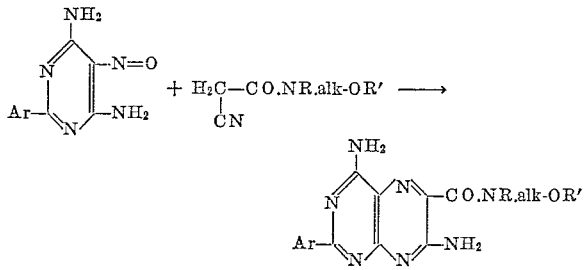

Particularly suitable neutral polar solvents for this reaction are alcohols such as methanol, ethanol, propanol, and butanol, glycol ethers such as 2-methoxyethanol, 2-ethoxyethanol, and methoxy and ethoxy propanols, and amides such as dimethylformamide, diethylformamide, and dimethylacetamide. Suitable basic catalysts for promoting the above condensation reaction include the alkali metal alkoxides and the alkali metal alkoxyalkoxides such as sodium methoxide, potassium ethoxide, sodium 2-methoxyethoxide, and sodium 2-ethoxyethoxide. Reaction temperatures of about 60 to 200° C. are suitable, and the reaction is ordinarily substantially complete in less than an hour's heating at such temperatures.

The novel pteridines of this invention may also be prepared by several processes in which a 4,7-diamino-2-arylpteridine substituted in the 6-position by a carboxy, carbamido, carboalkoxy, or cyano radical is then transformed into one of the N-(alkoxyalkyl)-6-pteridinecarboxamides of the invention.

Thus, for example, a 4,6-diamino-2-aryl-5-nitrosopyrimidine may be condensed with an alkyl cyanoacetate (by heating in anhydrous ethanol in the presence of sodium ethoxide, for example) to yield a 6-carboalkoxy-4,7-diamino-2-arylpteridine. Such an ester may be reacted with an alkoxyalkyl amine of the formula HNR—alk—OR'

(wherein R, alk, and R' have the meanings previously given) to form an N-(alkoxyalkyl)-4,7-diamino-2-aryl-6-pteridinecarboxamide of this invention.

An alternative method of preparation is to react a 6-carboalkoxy-4,7-diamino-2-arylpteridine with an alkanolamine of formula HNR—alk—OH (wherein R and alk have the meanings previously given) to form an N-(hydroxyalkyl)-4,7-diamino-2-aryl-6-pteridinecarboxamide which may then be converted by warming with thionyl chloride to an N-(chloroalkyl)-4,7-diamino-2-aryl-6-pteridinecarboxamide which, by reaction with an alkali metal alkoxide, is converted to an N-(alkoxyalkyl)-4,7-diamino-2-aryl-6-pteridinecarboxamide of this invention.

A generally less satisfactory but operable variant of the preceding method comprises treating a 6-carboalkoxy-4,7-diamino-2-arylpteridine with a haloalkylamine such as one having the formula HNR.alk—Cl (in which R and alk have the meanings previously given) and then treating the resulting N-(haloalkyl)-4,7-diamino-2-aryl-6-pteridinecarboxamide with a sodium alkoxide to yield an N-(alkoxyalkyl)-4,7-diamino-2-aryl-6-pteridinecarboxamide of this invention.

Instead of preforming a 6-carboalkoxy-4,7-diamino-2-arylpteridine and thereafter operating to replace the alkoxy radical thereof by an alkoxyamide radical, as just described, one may prepare a 4,7-diamino-2-aryl-6-pteridinecarboxylic acid by condensing a 4,6-diamino-2-aryl-5-nitrosopyrimidine with cyanoacetic acid; this pteridinecarboxylic acid may be converted to an acid chloride by treatment with thionyl chloride, phosphorus trichloride, phosphoryl chloride, or phosphorus pentachloride, and then condensed with an alkoxyalkanolamine to yield an N-(alkoxyalkyl)-4,7-diamino-2-aryl-6-pteridinecarboxamide of this invention. The 4,7-diamino-2-aryl-6-pteridinecarboxylic acid chloride may, of course, be reacted with an alkanolamine to form an N-(hydroxyalkyl)-4,7-diamino-2-aryl-6-pteridinecarboxamide which can be treated with thionyl chloride to replace the hydroxyl group by chlorine which may then in turn be replaced by alkoxy by treatment with an alkali metal alkoxide.

Another possible variation comprises esterifying a 4,7-diamino-2-aryl-6-pteridinecarboxylic acid by any suitable means and thereafter reacting the resulting ester with an alkoxyalkylamine as above or with a hydroxyalkylamine or haloalkylamine and then following the already outlined reaction sequences to obatin the N-(alkoxyalkyl)-4,7-diamino-2-aryl-6-pteridinecarboxamides of this invention.

A still further route to the compounds of this invention is one in which a 4,6-diamino-2-aryl-5-nitrosopyrimidine is condensed with malononitrile to form the corresponding 4,7-diamino-2-aryl-6-cyanopteridine, and in which this cyanopteridine is subsequently reacted with hydrogen chloride and a lower alkanol to form an iminoether. Such an iminoether may then be treated with an alkoxyalkylamine or an hydroxyalkylamine to form an amidine which is hydrolyzed to yield an N-(alkoxyalkyl)-4,7-diamino-2-aryl-6-pteridinecarboxamide of this invention or an N-(hydroxyalkyl)-4,7-diamino-2- aryl-6-pteridinecarboxamide which by the reactions discussed above may be converted to an N-(alkoxyalkyl)-4,7-diamino-2-aryl-6-pteridinecarboxamide of this invention.

The following examples illustrate the preparation of these new pteridine compounds. Examples 1–3 show the preparation of typical cyanoacetamides of value as intermediates in this invention, and Examples 4–10 show how pteridines typical of this invention may be prepared.

Example 1

A mixture of 38 g. of ethyl cyanoacetate, 39 g. of 3-isopropoxypropylamine and 50 ml. of absolute ethanol is boiled under reflux for 2½ hours. After removal of the solvent the residue is distilled in vacuo and a fraction, B.P. 127–129°/0.5 mm. collected. After several days standing in the cold room the material crystallizes. This is 2 - cyano - N - (3 - isopropoxypropyl)acetamide, M.P. 38° C.

Analysis.—Calculated: C=58.67, H=8.75, N=15.21. Found: C=58.64, H=9.07, N=15.28.

Example 2

A mixture of 44.6 g. of 2-ethoxyethylamine, 56.5 g. of ethyl cyanoacetate and 100 ml. of absolute ethanol is boiled under reflux for 2 hours and 40 minutes. After removal of the solvent on a rotary evaporator, the residual gum is scratched and solidifies. Recrystallization from ethyl acetate and petroleum ether affords 2-cyano-N-(2-ethoxyethyl)acetamide, M.P. 45° C.

Analysis.—Calculated: C=53.83, H=7.74, N=17.94. Found: C=53.70, H=7.73, N=17.82.

Example 3

A mixture of 75 g. of 2-methoxyethylamine, 113 g. of ethyl cyanoacetate and 100 ml. of absolute ethanol is boiled under reflux for 2½ hours. After concentration of the solution on a rotary evaporator the residual gum is cooled and the mass crystallizes. Recrystallization from ethyl acetate yields 2-cyano-N-(2-methoxyethyl)acetamide, M.P. 79° C.

Analysis.—Calculated: C=50.69, H=7.09, N=19.71. Found C=50.71, H=7.02, N=19.86.

Example 4

To a solution of 0.2 g. of sodium metal in 500 ml. of absolute ethanol is added 6.45 g. of 4,6-diamino-2-phenyl-5-nitrosopyrimidine, and the mixture is stirred and heated to the boiling point. This is followed by the addition of 6.0 g. of 2-cyano-N-(3-isopropoxypropyl)acetamide and the whole is boiled under reflux for 30 minutes. Concentration of the solution to small bulk yields a solid, wt.=9.1 g., M.P. 269–270° C. Recrystallization from ethanol yields 4,7-diamino-N-(3-isopropoxypropyl)-2-phenyl-6-pteridinecarboxamide, M.P. 265° C.

Example 5

To a solution of 0.2 g. of sodium metal in 400 ml. of absolute ethanol is added 6.45 g. of 4,6-diamino-2-phenyl-5-nitrosopyrimidine; the mixture is stirred mechanically and boiled under reflux for 5 minutes. Following this, 5.15 g. of 2-cyano-N-(2-ethoxyethyl)acetamide is added and boiling continued for 1 hour. On cooling, the solution deposits crystals of N-(2-ethoxyethyl)-4,7-diamino-2-phenyl-6-pteridinecarboxamide, wt.=7.3 g., M.P. 283° C. Recrystallization from ethanol affords a product melting at 282° C.

Analysis.—Calculated: C=57.78, H=5.42, N=27.75. Found: C=57.99, H=5.76, N=28.01.

Example 6

To a solution of 0.2 g. of sodium metal in 400 ml. of absolute ethanol is added 6.45 g. of 4,6-diamino-2-phenyl-5-nitrosopyrimidine, followed by 4.7 g. of 2-cyano-N-(2-methoxyethyl)acetamide. The mixture is stirred and boiled under reflux for 1 hour. On cooling, yellow crystals are deposited, wt.=7.8 g., M.P. 294° C. Recrystallization from aqueous 2-ethoxyethanol affords N-(2-methoxyethyl) - 4,7 - diamino - 2 - phenyl - 6-pteridinecarboxamide, M.P. 293° C.

Analysis.—Calculated: C=56.63, H=5.05, N=28.90. Found: C=56.32, H=4.91, N=28.61.

Example 7

To a solution of 0.2 g. of sodium in 500 ml. of absolute ethanol is added 5.68 g. of 4,6-diamino-2-(3,4-dichlorophenyl)-5-nitrosopyrimidine, followed by 3.5 g. of 2-cyano - N - (2 - ethoxyethyl)acetamide. The mixture is stirred and boiled under reflux for 30 minutes, during which time a yellow crystalline material deposits out of solution. After cooling, this is removed by filtration and recrystallized from ethanol to yield N-(2-ethoxyethyl)-4,7 - diamino - 2 - (3,4 - dichlorophenyl) - 6 - pteridinecarboxamide, M.P. 285° C.

Analysis.—Calculated: C=48.35, H=4.06, N=23.22, Cl=16.79. Found: C=48.58, H=3.97, N=23.33, Cl=16.77.

Example 8

N - (2 - methoxyethyl) - 4,7 - diamino - 2 - (p - chlorophenyl)-6-pteridinecarboxamide is prepared by the reaction of 4,6 - diamino - 2 - (p - chlorophenyl) - 5-nitrosopyrimidine with 2-cyano-N-(2-methoxyethyl)acetamide as in Example 6.

Example 9

N - (3 - isopropoxypropyl) - 4,7 - diamino - 2 - (p-tolyl)-6-pteridinecarboxamide is prepared by the reaction of 4,6 - diamino - 2 - (p - tolyl) - 5 - nitrosopyrimidine with 2 - cyano - N - (3 - isopropoxypropyl)acetamide as in Example 4.

Example 10

N - (2 - ethoxyethyl) - 4,7 - diamino - 2 - (p - anisyl)-6-pteridinecarboxamide is prepared by the reaction of 4,6-diamino-2-(p-anisyl)-5-nitrosopyrimidine with 2-cyano-N-(2-ethoxyethyl)-acetamide as in Example 5.

Example 11

N - (2 - methoxyethyl) - 4,7 - diamino - 2- (o - tolyl)-6-pteridinecarboxamide is prepared by the reaction of 4,6-diamino-2-(o-tolyl)-5-nitrosopyrimidine with 2-cyano-N-(2-methoxyethyl)acetamide as in Example 6.

I claim:
1. The compound of the formula:

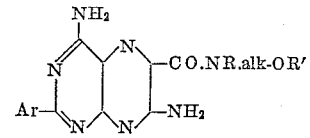

wherein: Ar is a member selected from the group consisting of phenyl and phenyl substituted by from one to two members of the group consisting of lower alkyl, lower alkoxy, fluorine, chlorine, bromine, and trifluoromethyl; R is a member selected from the group consisting of hydrogen and lower alkyl; alk is a member selected from the group consisting of methylene, ethylene, trimethylene and tetramethylene and R' is lower alkyl.

2. N - (3 - isopropoxypropyl) - 4,7 - diamino - 2-phenyl-6-pteridinecarboxamide.

3. N - (2 - ethoxyethyl) - 4,7 - diamino - 2 - phenyl - 6-pteridinecarboxamide.

4. N - (2 - methoxyethyl) - 4,7 - diamino - 2 - phenyl-6-pteridinecarboxamide.

5. N - (2 - ethoxyethyl) - 4,7 - diamino - 2 - (3,4 - dichlorophenyl) - 6 - pteridinecarboxamide.

References Cited in the file of this patent
UNITED STATES PATENTS
2,975,180    Osdene              Mar. 14, 1961